United States Patent
Darmes et al.

(10) Patent No.: US 6,188,040 B1
(45) Date of Patent: Feb. 13, 2001

(54) METHOD FOR MAKING AN OBJECT MADE OF TRANSLUCENT SYNTHETIC MATERIAL, IN PARTICULAR AN OPHTHALMIC LENS, MARKED OBJECT AND CORRESPONDING READER

(75) Inventors: Daniel Darmes, Pontault-Combault; Gilles Lefebvre, Chennevières sur Marne; Sylvie Maze, Cachan; Eric Freon, Paris; Francis Bell, Ivry sur Seine, all of (FR)

(73) Assignee: Essilor International Compagnie Generale d'Optique, Charenton le Pont (FR)

( * ) Notice: Under 35 U.S.C. 154(b), the term of this patent shall be extended for 0 days.

(21) Appl. No.: 09/155,328
(22) PCT Filed: Jan. 26, 1998
(86) PCT No.: PCT/FR98/00130
 § 371 Date: Oct. 15, 1998
 § 102(e) Date: Oct. 15, 1998
(87) PCT Pub. No.: WO98/33088
 PCT Pub. Date: Jul. 30, 1998

(30) Foreign Application Priority Data
Jan. 28, 1997 (FR) .................................................. 97 00873

(51) Int. Cl.[7] .................................................. B23K 26/00
(52) U.S. Cl. .................................. 219/121.6; 219/121.65; 219/121.67
(58) Field of Search ........................... 219/121.6, 121.65, 219/121.67, 121.68, 121.69

(56) References Cited

U.S. PATENT DOCUMENTS 4,194,814  3/1980  Fischer et al. .

FOREIGN PATENT DOCUMENTS

| 37 28 622 | 5/1988 | (DE) . |
| 196 08 937 | 9/1996 | (DE) . |
| 2 621 529 | 4/1989 | (FR) . |

*Primary Examiner*—Patrick Ryan
*Assistant Examiner*—M. Alexandra Elve
(74) *Attorney, Agent, or Firm*—Young & Thompson

(57) ABSTRACT

A translucent synthetic material article such as an ophthalmic lens comprises a plurality of well-shaped cells, some of which have at least one upstanding projection on their bottom walls. The projection have a height between 1/5 and 1/1 the cell depth and are upwardly tapering and wedge-shaped. The plurality of cells are arranged in rows and columns to define a matrix. When the translucent article is illuminated, the well-shaped cells with upstanding projections display enhanced contrast compared with such cells without upstanding projections, thereby producing an identification marking or the like.

23 Claims, 1 Drawing Sheet

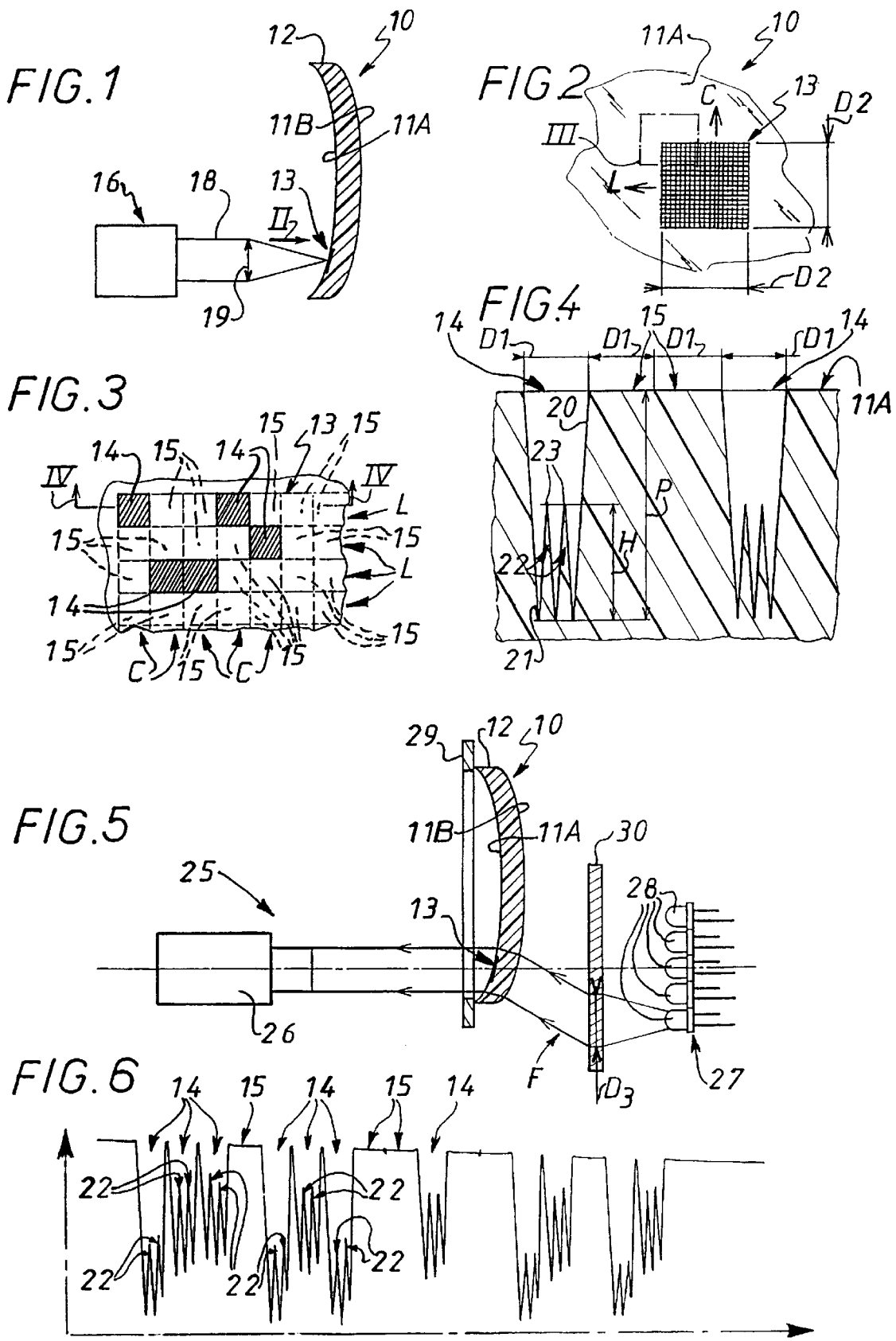

METHOD FOR MAKING AN OBJECT MADE OF TRANSLUCENT SYNTHETIC MATERIAL, IN PARTICULAR AN OPHTHALMIC LENS, MARKED OBJECT AND CORRESPONDING READER

BACKGROUND OF THE INVENTION

The present invention concerns marking any translucent synthetic material object, i.e. applying a symbol to that object for identifying and/or tracing it.

The symbol can include, for example, a serial number, a reference number or any other inscription relating to the characteristics of the object concerned, the treatment it has undergone or that it is to undergo.

The present invention is more particularly, although not necessary exclusively, directed to the situation in which the object is an ophthalmic lens.

To assure the identification and/or the tracing, i.e. the "traceability", of an ophthalmic lens, whether it is a mineral glass ophthalmic lens or an organic material (synthetic material) ophthalmic lens, and thereby to enable its characteristics to be determined at any time by a simple reading process, it is necessary to apply to it a symbol including all the required information, in encoded form or otherwise.

In the case of a mineral glass ophthalmic lens, or more generally any object made from such glass, for example the molding shells used to mold synthetic material ophthalmic lenses, it has been proposed to use an etching process, in particular a laser etching process.

This is the case, for example, in published French patent application N°2 732 917 (application N°95 04314 filed Apr. 11, 1995).

In the above French patent application, it is proposed to cause the beam from a YAG laser to interfere with a layer of a particular material, in this instance a cement capable of reacting with the glass, applied to the surface of the object to be treated beforehand for this purpose.

This has the advantage of combining the resulting etching with a coloration which, by increasing the contrast of the etching, facilitates and renders more accurate subsequent reading of the symbol obtained in this way.

In the case of marking mineral glass objects, it is therefore satisfactory.

However, although they may be acceptable for mineral glass objects to be used many times, for example molding shells for molding synthetic material ophthalmic lenses, the costs inherent in the use of a cement of this kind are less acceptable for synthetic material objects which are not re-used, for example the ophthalmic lenses themselves, because they represent an unnecessary increase in the overall cost of such items.

Moreover, no such cement is necessary in this case, an appropriate choice of its wavelength enabling the laser beam to react directly with the synthetic material.

BRIEF SUMMARY OF THE INVENTION

A general object of the present invention is an arrangement which advantageously achieves sufficient contrast of the symbol obtained for subsequent reading of the symbol to be reliable, despite the absence of cement.

To be more precise, the present invention consists firstly in a method of marking a translucent synthetic material object, for example a synthetic material ophthalmic lens, it being understood that this material is then not only translucent but also transparent, and that the object concerned can be bare, varnished or coated with any material, for example an anti-reflection material.

The method in accordance with the invention is generally characterized in that said object is etched in the form of cells and each etched cell is in the form of a well and has at least one projection upstanding on the bottom of said well.

Trials have confirmed that, with a projection of this kind, each etched cell appears on reading as an area sufficiently dark to be identified as actually being an etched cell.

The reason for this is probably that the projection leads to local diffusion and/or refraction of light enabling the required identification of an etched cell as such by contrast with a non-etched cell.

When, in a preferred embodiment, the etching is assured in a manner known in itself using a laser, each etched cell is made, for example, by using the laser to execute at least two shots offset relative to each other.

As also confirmed by trials, the offset between the shots provides a very simple way to obtain the required projection.

Because of this offset, the shots resemble scanning with a small amplitude which conditions the width finally obtained for the etched cell formed in this way.

In practise three laser shots forming two projections for each etched cell constitute, in accordance with the invention, a good compromise between fast execution of the symbol required and sufficient definition of the latter for subsequent reading.

The present invention further consists in any translucent synthetic material object, and in particular any ophthalmic lens, provided with a symbol of the above kind.

Trials show that subsequent reading of this symbol can advantageously be reliable, even after the application to any such object of a layer of any thin and transparent material, such as a varnish or an anti-reflection material.

The present invention further consists in a symbol reader enabling such reading to be effected in a simple manner.

The symbol reader is generally characterized in that it includes a CCD camera and an illuminating device adapted to generate a beam the transverse dimension of which is between one and three times that of the symbol to be read.

For example, this illuminating device is an illuminating strip disposed transversely to the optical axis of the system.

To read the symbol on a translucent synthetic material object it is sufficient to dispose the symbol on the object between the CCD camera and the illuminating strip.

No calibration or supplementary adjustment is necessary.

BRIEF DESCRIPTION OF THE DRAWINGS

The various aspects of the invention, their features and their advantages will emerge from the following description given by way of example with reference to the accompanying diagrammatic drawings.

FIG. 1 is a sectional elevation view showing the marking in accordance with the invention of a translucent synthetic material object;

FIG. 2 is a partial plan view of this object, at the location of the symbol that it carries after such marking, to a larger scale and in the direction of the arrow II in FIG. 1;

FIG. 3 shows the detail III from FIG. 2 to a still larger scale;

FIG. 4 is a partial sectional view of the object marked in this way taken along the line IV—IV in FIG. 3 and to a still larger scale;

FIG. 5 is a sectional elevation view, similar to FIG. 1, of a symbol reader in accordance with the invention;

FIG. 6 is an example of etching measured by means of a roughness meter.

DETAILED DESCRIPTION OF THE INVENTION

The figures show, by way of example, the situation in which the object 10 to be marked is an ophthalmic lens, to be more precise an unprocessed ophthalmic lens, i.e. a circular contour blank to be trimmed to fit it to an eyeglass frame.

The object 10 therefore has two main faces 11A, 11B, one of which is concave and the other convex, and an edge 12, in practise a flat edge.

In the case of a correcting ophthalmic lens, at least one of the main faces 11A, 11B is spherical, aspherical, toroidal, progressive or multifocal.

This is usually the convex face 11B intended to form its front face.

Be this as it may, the object 10 to be marked, which can be bare, varnished or coated with any material, for example an anti-reflection material, is made from a translucent synthetic material and, more precisely, in this case of an ophthalmic lens, a transparent synthetic material.

This synthetic material can be any synthetic material that can be used to manufacture an ophthalmic lens, for example, such as those sold under the trade names "ORMA" and "ORMEX" or those described in French patent N°2 699 541, for example.

As previously stated, the aim is to apply at least one localized symbol 13 to the object 10 for identifying it and/or tracing it.

In the embodiment shown, there is only one symbol 13.

This symbol 13 is preferably, but not necessarily exclusively, applied to the concave main face 11A of the object 10, near the edge 12 of the latter, in a part of the object 10 that will be removed when it is trimmed and/or its surface is machined.

To form the symbol 13 the object 10 is etched in a cellular manner known in itself.

In other words, the symbol 13 comprises at least one etched cell 14 and is in practise made up of a plurality of etched cells 14 recessed into the surface of the object 10 which alternate individually or in groups with non-etched (i.e. still smooth) cells 15 on the object 10.

For better individualization relative to the non-etched cells 15, the etched cells 14 are shaded in FIG. 3.

Furthermore, to simplify the drawing, FIG. 3 shows the etched cells 14 as having a square contour when seen in plan view.

It goes without saying that this contour can be different, however, for example rectangular.

Be this as it may, the etched cells 14 preferably all have the same contour, as is the case in the embodiment shown.

The non-etched cells 15 themselves all have the same contour, which is the same as that of the etched cells 14.

In the embodiment shown, and in a manner that is known in itself, the etched cells 14 are divided into lines L and columns C constituting a matrix type symbol.

As shown diagrammatically in FIG. 1, the etching necessary to mark the object 10 is assured, in a manner that is known in itself, by means of a laser 16 the beam 18 from which forms a focused or unfocused spot on the main face 11A of the object 10, using a galvanometer head 19 enabling deviation at will along the outline of the symbol 13 to be obtained.

The corresponding arrangements are well known in themselves and will not be described here, not being relevant to the present invention.

Suffice to say that, in practise, the laser 16 is a CO2 type laser, for example, having a wavelength equal to 10 μm, and that it preferably operates continuously, under the control of a computer, its beam being interrupted on command by means of an electromagnetic shutter.

In accordance with the invention, each etched cell 14 is in the form of a well 20 as shown diagrammatically in FIG. 4 and has at least one upstanding projection 22 on the bottom 21 of the well 20.

Although this is not obligatory, the maximum amplitude H of the projection 22 above the bottom 21 of the well 20 is preferably a fraction of the depth P of the well 20 having a value between a value equal to one fifth of the depth P and a value equal to the depth P, the depth P being measured from the main face 11A concerned of the object 10.

In other words $$\frac{P}{5} < H < P$$

Although this is not obligatory, the maximum amplitude H of the projection or projections 22 upstanding from the bottom 21 of the well 20 is preferably equal to at least two fifths of the depth P of the latter.

Although this is not obligatory, the wells 20 formed by the various etched cells 14 preferably have substantially the same depth P.

In the embodiment shown, each of the wells 20 formed by an etched cell 14 has upstanding on its bottom 21 two projections 22 offset relative to each other.

The two projections 22 have substantially the same maximum amplitude H.

Although this is not obligatory, the projections 22 are preferably in the form of spikes, as shown here.

In other words, they are generally wedge-shaped and taper from the bottom 21 of the well 20 to their apex 23, which forms a sharp edge.

At their apex 23, the projections 22 divide the internal volume of the well 20 transversely into three substantially equal parts, as shown in FIG. 4.

In accordance with the invention, to obtain projections 22 on the bottom 21 of the well 20 formed by each etched cell 14, the etched cell 14 is made by executing at least two shots of the laser 16 offset relative to each other.

Obviously, two such shots produce one projection 22.

In the case where, as shown, two projections 22 are upstanding from the bottom 21 of the well 20 formed by each etched cell 14, an etched cell 14 of this kind is therefore obtained by executing with the laser 16 three successive shots offset relative to each other.

For aligned etched cells 14 the corresponding line L is preferably scanned a number of times equal to the number of shots to be effected using the laser 16 and, from one scan to the next, the shots are offset by the same amount for each of the etched cells 14 to be produced.

As previously indicated, each etched cell 14 is itself the result of scanning with a small amplitude by offsetting the shots which produce it.

Let $D_1$ be the transverse dimension at the surface of each etched cell 14 and therefore of each non-etched cell 15.

This transverse dimension $D_1$ is preferably at least equal to 0.1 mm.

For example, it is in the order 0.35 mm.

If, under these conditions, the symbol 13 includes a number of lines L between 15 and 25 and an equal number of columns C, for example, this number being in the order of 19, for example, the transverse dimension $D_2$ of the symbol 13 is in the range 1.5 mm to 25 mm, for example around 6 mm.

A symbol reader 25 of the type shown in FIG. 5 can be used for subsequent reading of the symbol 13.

In accordance with the invention, the symbol reader 25 includes a CCD camera 26 and an illuminating device 27 adapted to generate at least one beam F the transverse dimension $D_3$ of which is between one and five times that $D_2$ of the symbol 13 to be read, which is favorable to obtaining good contrast.

In the embodiment shown, the illuminating device 27 includes, by way of non-limiting example, one or more light sources 28, in this instance several of them, each generating a beam F and being placed on a line transverse to the overall optical axis.

The CCD camera 26 is well known in itself and will not be described here, not being relevant to the present invention.

Suffice to say that it is a charge-coupled device including an array made up of a plurality of receiving cells.

The light sources 28 can be light-emitting diodes, for example.

As shown here, for example, five light sources 28 can be provided, regularly arranged on either side of the overall optical axis.

In the embodiment shown, there is a support plane 29 against which the object 10 has to be applied, and which can be an apertured plate, for example, between the CCD camera 26 and the illuminating device 27 and a frosted glass 30 between the support plane 29 and the illuminating device 27.

In practise the transverse dimension $D_3$ of a beam F from the illuminating device 27 is that at the level of this frosted glass 30.

In use, the light sources 28 are turned on one after the other.

The central light source 28, which is on the overall optical axis, illuminates the object 10 in an area of the latter that does not generate any prism effect.

The light sources 28 farthest from the axis of the CCD camera 26 compensate to a greater or lesser degree the prism deviation that can be caused by the object 10 at the location of the symbol 13.

Each halo of light projected onto the frosted glass 30 by a light source 28 acts as a diffusive source.

On reading the symbol 13, and as mentioned above, the etched cells 14 show dark in a manner that is highly contrasted to the non-etched cells 15.

Thus reading is particularly reliable.

The FIG. 6 diagram corresponds to a reading taken by means of a roughness meter along a column C of the symbol 13.

The projections 22 are clearly apparent.

They are clearly much more than mere roughness of the surface.

Particularly satisfactory results have been obtained with symbols 13 in which each etched cell 14 forms a well 20 having a depth P at least equal to 25 $\mu$m, with a maximal amplitude H of the projection or projections 22 on the bottom 21 of the well 20 in the range 5 $\mu$m to 25 $\mu$m.

Of course, the numerical values given above are given by way of example only and cannot in any way be regarded as limiting on the present invention.

More generally, the present invention is not limited to the embodiments and uses described and shown, but encompasses any variant execution.

In the case of the symbol reader in particular, other embodiments of the illuminating device used are feasible. For example, the latter can use optical fibers or an extensive light source behind a mobile diaphragm.

What is claimed is:

1. A method of marking a translucent synthetic material comprising the steps of (i) providing at least one well-shaped cell and (ii) forming on a bottom wall of said at least one cell at least one upstanding projection.

2. A method according to claim 1, wherein said at least one upstanding projection defines at least one spike.

3. A method according to claim 1, wherein the forming of the at least one upstanding projection comprises etching the at least one cell by successively offset laser shots.

4. A method according to claim 1, wherein the forming of two such upstanding projections comprises etching the at least one cell with successively offset laser shots.

5. A method according to claim 1, wherein said at least one upstanding projection is formed by laser etching the at least one cell to remove downwardly tapering wedge-shaped synthetic material portions.

6. A method according to claim 1, wherein a plurality of well-shaped cells are provided, some of said plurality of cells having at least one upstanding projection.

7. A method according to claim 1, wherein the plurality of well-shaped cells are arranged in a line, and further comprising scanning the line of cells a number of times equal to the number of upstanding projections to be formed, and offsetting the laser shots of successive scans for respective cells a selected predetermined amount.

8. A method according to claim 7, wherein said plurality of well-shaped cells comprises a matrix of rows and columns of cells.

9. A method according to claim 7, wherein when the translucent article is illuminated said well-shaped cells having at least one upstanding projection produce enhanced contrast compared with said well-shaped cells devoid of at least one projection.

10. A translucent synthetic material article comprising at least one well-shaped cell, the at least one cell having a bottom wall, and at least one upstanding projection on said bottom wall.

11. A translucent article according to claim 10, wherein said at least one cell has a depth, said at least one projection having a height between 1/5 and 1/1 the cell depth.

12. A translucent article according to claim 10, wherein said at least one projection has a height between 5 $\mu$m and 25 $\mu$m.

13. A translucent article according to claim 10, wherein said at least one projection is an upwardly tapering and wedge-shaped.

14. A translucent article according to claim 10 wherein said at least some of said cells have two upstanding projections on their bottom walls spaced from each other.

15. A translucent article according to claim 14, wherein respective sides of the two projections in said at least one cell are substantially parallel to each other.

16. A translucent article according to claim 1, wherein a plurality of well-shaped cells are provided, some of said plurality of cells have at least one upstanding projection.

17. A translucent article according to claim 16, wherein said at least one projection of said some of said plurality of cells have substantially the same height.

18. A translucent article according to claim 14, wherein said two projections of said at least some of said cells have apexes at their uppermost ends, said apexes of the two projections transversely dividing the corresponding cell into substantially equal parts.

19. A translucent article according to claim 10, wherein said at least one cell has a transverse dimension of at least 0.1 mm.

20. A translucent article according to claim 16, wherein said at least one cell has a transverse dimension of about 0.35 mm.

21. A translucent article according to claim 16, wherein said plurality of cells are arranged in rows and columns and define a marking.

22. A translucent article according to claim 16, wherein said at least one upstanding projection defines at least one spike.

23. A translucent article according to claim 16, wherein when the translucent article is illuminated said well-shaped cells having at least one upstanding projection display enhanced contrast compared with said well-shaped cells devoid of at least one upstanding projection.

* * * * *